United States Patent [19]
Chiu

[11] Patent Number: 5,316,415
[45] Date of Patent: May 31, 1994

[54] POWER DRILL ADAPTER FOR SAWING OPERATION WITH A SAW BLADE TRANSMISSION

[76] Inventor: Yong Ho Chiu, No. 26, Lane 48, Hwai Tei Street, Taipei, Taiwan

[21] Appl. No.: 69,770

[22] Filed: Jun. 1, 1993

[51] Int. Cl.⁵ .............................................. B23B 47/00
[52] U.S. Cl. ..................................... 408/24; 144/35 R; 173/50
[58] Field of Search ................ 408/20, 22, 24, 30; 7/158; 144/35 A, 35 R; 173/50, 51; 29/26 A

[56] References Cited

U.S. PATENT DOCUMENTS

| | | | |
|---|---|---|---|
| Re. 23,139 | 8/1949 | Langfelder | 408/22 |
| 257,309 | 5/1882 | Ford | 408/24 |
| 1,898,956 | 2/1933 | Harvie | 144/35 A |
| 2,526,976 | 10/1950 | Smith | 408/22 |
| 2,775,898 | 1/1957 | Baier | 29/26 A |

Primary Examiner—Daniel W. Howell
Attorney, Agent, or Firm—Shoemaker and Mattare, Ltd.

[57] ABSTRACT

A power drill with a saw blade transmission including a motor fastened inside a housing to turn a drill, a driven gear meshed with a drive gear mounted on the output shaft of the motor, a channel bearing disposed inside the housing, a transmission gear disposed inside the housing and driven by the driven gear, the transmission gear having an eccentric transmission shaft driven by the driven gear to impart a reciprocating movement to the channel bearing, and a linking shaft fixed to the channel bearing and driven to reciprocate a saw blade for cutting.

7 Claims, 3 Drawing Sheets

FIG. 1
FIG. 6
FIG. 7
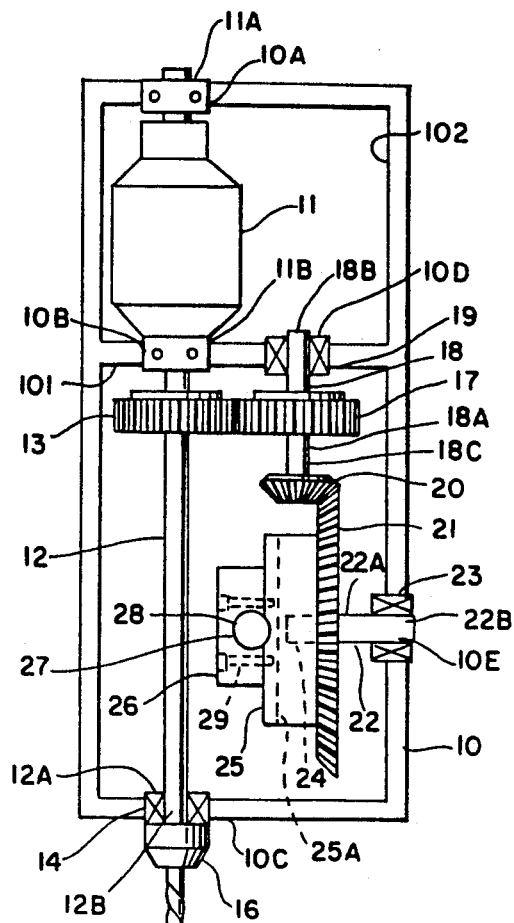
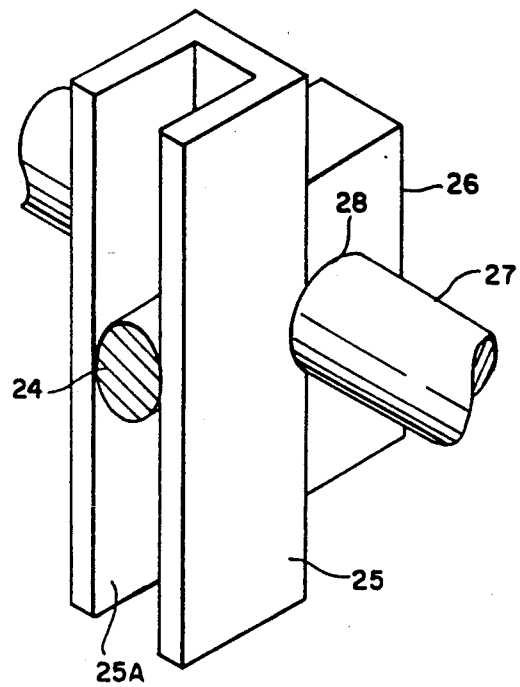
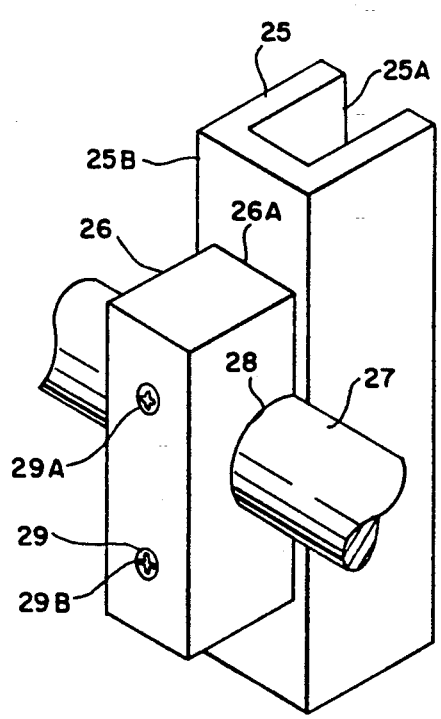

POWER DRILL ADAPTER FOR SAWING OPERATION WITH A SAW BLADE TRANSMISSION

BACKGROUND OF THE INVENTION

The present invention relates to a power drill adapter for sawing operation, and more particularly to a power drill adapter for sawing operation with a saw blade transmission which can be alternatively used to drive a saw blade.

Power drills and power saws are two different types of motor-driven hand tools separately prepared for different working purposes. A power drill can only be used to drive a bit through a rotary motion while a power saw can only be used to reciprocate a saw blade. Therefore, the more power tools used, the more storage space needed, and more money will have to be spent on different power tools for different purposes.

SUMMARY OF THE INVENTION

The principal object of the present invention is to provide a power drill adapter with a saw blade transmission which can be alternatively used for drilling or sawing purpose.

According to the preferred embodiment of the present invention, an eccentric transmission shaft is fastened inside the housing of the power drill adapter and driven by the motor drive of the power drill adapter through a drive gear and a driven gear to reciprocate a channel bearing, a linking shaft is fastened to a locating block on the channel bearing to carry a saw blade. Therefore, reciprocating the channel bearing causes the saw blade to be alternatively moved back and forth by the linking shaft for cutting.

BRIEF DESCRIPTION OF THE DRAWINGS

FIG. 1 is a front sectional view of a power drill adapter according to the first embodiment of the present invention;

FIG. 6 is a perspective right side view of the channel bearing and the locating block; and FIG. 7 is a perspective left side view of the channel bearing and the locating block.

DETAILED DESCRIPTION OF THE PREFERRED EMBODIMENT

Figure 2:
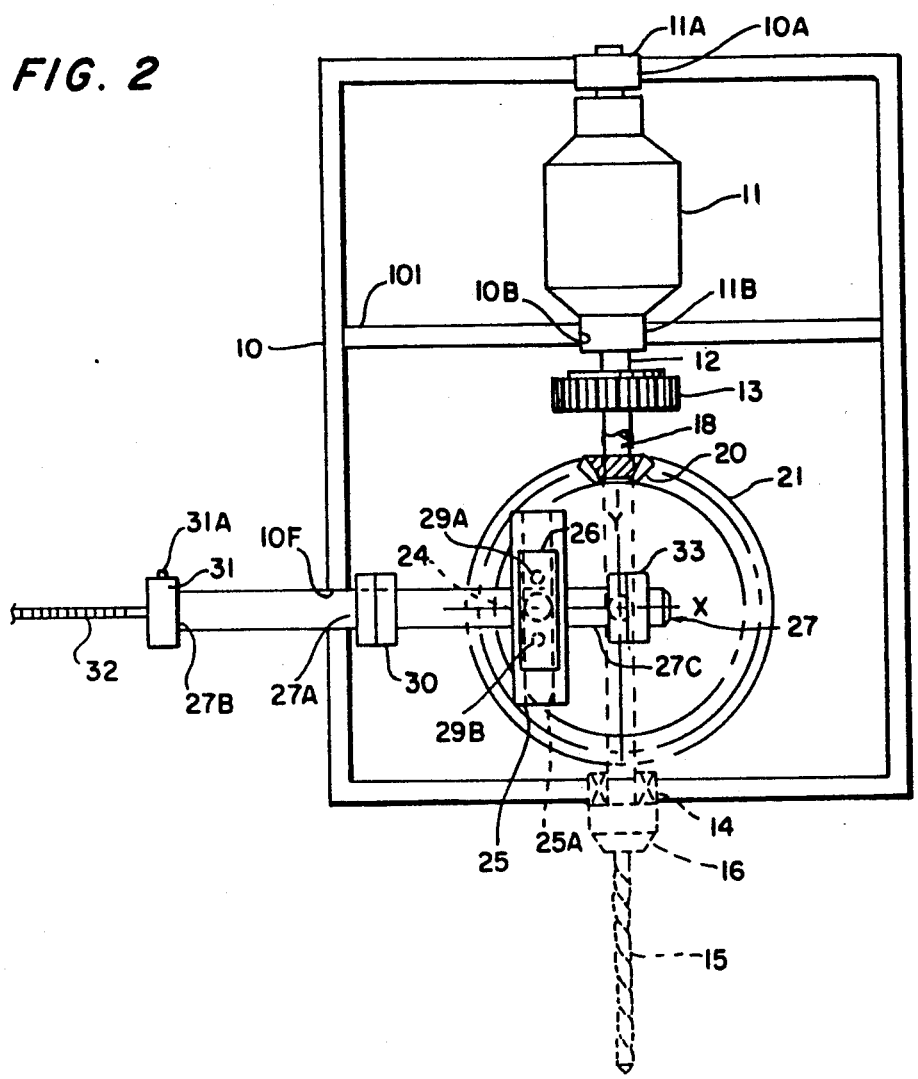
FIG. 2 is a sectional side view of the power drill adapter showing the eccentric transmission shaft disposed at the 0° position.

Referring to FIG. 1, housing 10 of the power drill adapter in accordance with the preferred embodiment of the present invention is made in a rectangular configuration with its two opposite shorter sides disposed in horizontal position and its two opposite longer sides disposed in vertical position. A top locating hole 10A is made on the top of the housing 10 near the left corner. A bottom locating hole 10B is provided on a horizontal partition wall 101 inside the housing 10 in line with the hole 10A. A motor 11 is mounted inside the housing 10, with the top end 11A of the motor casing fastened to the top locating hole 10A and the bottom end 11B of the motor casing fastened to the bottom locating hole 10B. The output shaft 12 of the motor 11 extends downwards vertically. A drive gear 13 is fastened around the output shaft 12 of the motor 11 near the partition wall 101. The lower portion 12A of the output shaft 12 of the motor 11 is rotatably inserted into a bearing 14 mounted within an output hole 10C on the bottom shorter side of the housing 10. The bottom end 12B of the lower portion 12A of the output shaft 12 extends out of the bearing 14. A drill 15 is fastened to the bottom end 12B of the output shaft 12 by a chuck 16.

Referring to FIG. 1 again, a driven gear 17 is mounted around the middle part 18A of a driven shaft 18 and meshed with the drive gear 13 in a horizontal position. The driven shaft 18 has a top end 18B rotatably inserted into a hole 10D on the partition wall 101 by a bearing 19, and a bottom end 18C coupled with a first bevel gear 20 being disposed in a horizontal position. A second bevel gear 21 is mounted around the left end 22A of a horizontal axle 22 in a vertical position, and meshed with the first bevel gear 20 at a right angle. The right end 22B of the horizontal axle 22 is rotatably mounted in a hole 10E on the longer right side 102 of the housing 10 by a bearing 23.

Referring to FIGS. 1 and 2 again, the second bevel gear 21 comprises an eccentric transmission shaft 24 horizontally extended leftwards at an eccentric location. A channel bearing 25 is coupled to the eccentric transmission shaft 24. The channel bearing 25 defines a channel 25A, in which the eccentric transmission shaft 24 is driven to slide. A locating block 26 is provided on the channel bearing 25 at the left side (as shown in FIG. 1). A locating hole 28 is provided which extends laterally through the junction between the left side 26A of the locating block 26 and the right side 25B of the channel bearing 25 to hold a linking shaft 27. Screw holes 29A, 29B are made on the locating block 26, into which screws 29 are respectively engaged to connect the locating block 26 and the linking shaft 27 to the channel bearing 25.

Referring to FIGS. 6 and 7, and FIGS. 1 and 2 again, the linking shaft 27 has two opposite ends respectively extended out of the locating hole 28 at two opposite sides. The left portion 27A of the linking shaft 27 inserts through an axle block 30, and then extends out of the housing 10 through an axle hole 10F thereon at a distance. A saw blade 32 is connected to the terminal end 27B of the linking shaft 27 by a saw blade holder 31. A set screw 31A is threaded into a side hole (not shown) on the saw blade holder 31 to hold down the saw blade 32. The right end 27C of the linking shaft 27 is connected to another axle block 33.

Figure 5:
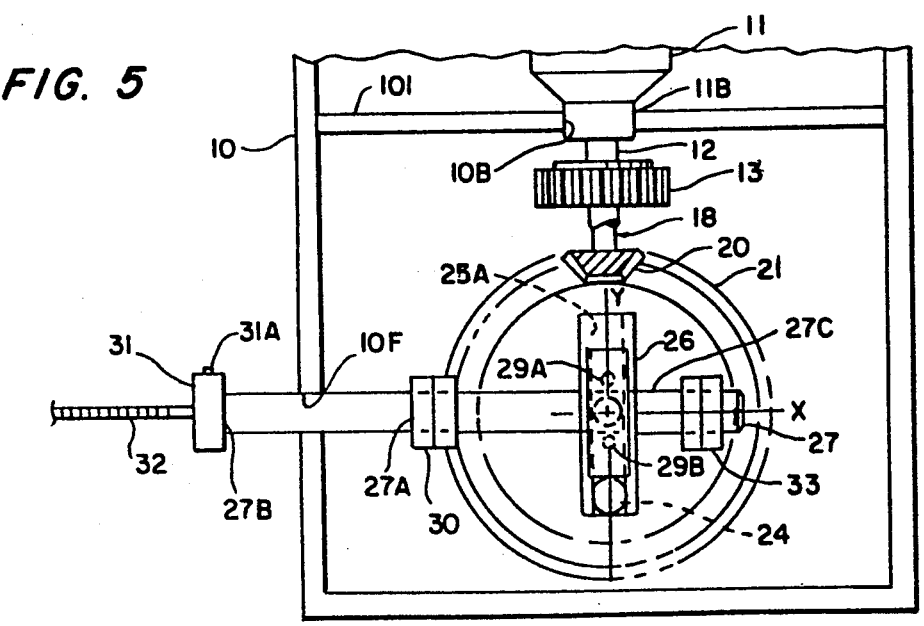
FIG. 5 is similar to FIG. 2 but showing the eccentric transmission shaft moved to the 270° position.
Figure 4:
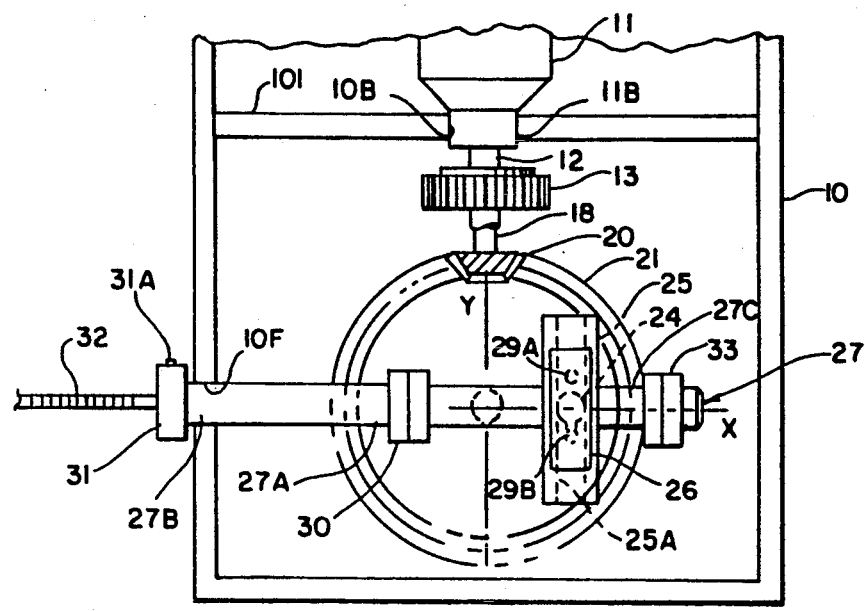
FIG. 4 is similar to FIG. 2 but showing the eccentric transmission shaft moved to the 180° position.
Figure 3:
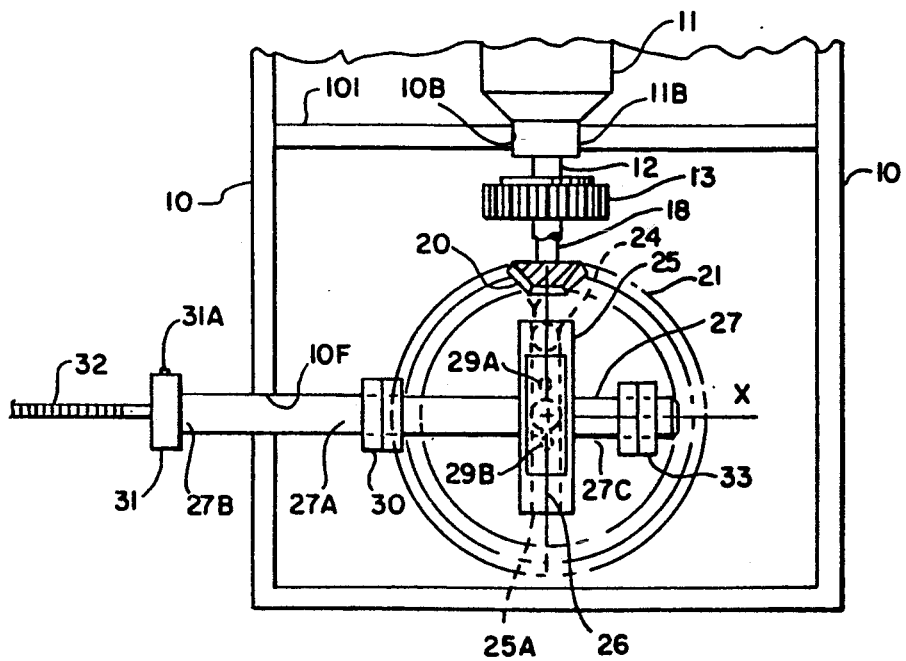
FIG. 3 is similar to FIG. 2 but showing the eccentric transmission shaft moved to the 90° position.

Referring to FIGS. 3, 4 and 5 and FIG. 2 again, as the motor 11 is started, the drill 15 is caused to rotate by the output shaft 12 of the motor 11 for drilling holes on workpieces. Alternatively, the tool can be used to reciprocate a saw blade for cutting workpieces. As the motor 11 is started, the driven gear 17 is driven by the drive gear 13 to rotate the first bevel gear 20 via the driven shaft 18, causing the first bevel gear 20 to move the second bevel gear 21. As the second bevel gear 21 is rotated, the eccentric transmission shaft 24 is rotated to impart a reciprocating movement to the channel bearing 25 and the locating block 26, thereby causing the saw blade 32 to be reciprocated by the linking shaft 27.

The reciprocating motion of the linking shaft 27 is outlined hereinafter. Presume that the eccentric transmission shaft 24 is disposed at the 0° position on the X-axis of the second bevel gear 21, as shown in FIG. 2, thus the eccentric transmission shaft 24 is positioned at the middle of the channel 25A of the channel bearing 25; the channel bearing 25 and the locating block 26 are positioned at the left side of the second bevel gear 21. This position is the leftward limit of the movement of the linking shaft 27 which confines the leftward movement of the saw blade 32.

Referring to FIG. 3, as the eccentric transmission shaft 24 is moved clockwise from the 0° position to the 90° position i.e., when it is located on the Y-axis of the second bevel gear 21, the eccentric transmission shaft 24 becomes disposed at the upper end of the channel 25A of the channel bearing 25, and the channel bearing 25 and the locating block 26 become disposed on the Y-axis of the second bevel gear 21, and therefore the linking shaft 27 as well as the saw blade 32 are moved rightwards through an appropriate distance.

Referring to FIG. 4, as the eccentric transmission shaft 24 is moved from the 90° to the 180° position and located on the X-axis of the second bevel gear 21, the eccentric transmission shaft 24 becomes disposed in the middle of the channel 25A of the channel bearing 25, and the channel bearing 25 and the locating block 26 are moved to the right side of the second bevel gear 21. This position is the rightward limit of the movement of the linking shaft 27 and the saw blade 32.

Referring to FIG. 5, as the eccentric transmission shaft 24 is moved from the 180° position to the 270° position on the Y-axis of the second bevel gear 21, the eccentric transmission shaft 24 becomes disposed at the lower end of the channel 25A of the channel bearing 25, and the channel bearing 25 and the locating block 26 become disposed on the Y-axis of the second bevel gear 21 again, and therefore the linking shaft 27 is moved leftwards together with the saw blade 32 through an appropriate distance.

Referring to FIG. 2 again, as the eccentric transmission shaft 24 is moved from the 270° position to the 360° position (returned to the 0° position) on the X-axis of the second bevel gear 21, the eccentric transmission shaft 24 becomes disposed in the middle of the channel 25A of the channel bearing 25, and the channel bearing 25 and the locating block 26 are moved to the left side of the second bevel gear 21. This position is identical to the 0° position, namely, the leftward limit position of the linking shaft 27 and the saw blade 32.

As indicated, the present invention provides a power drill adapter which turns a drill by a motor directly, and which has a transmission gear coupled to the output shaft of the motor for reciprocating a saw blade for cutting objects.

While only one embodiment of the present invention has been shown and described, it will be understood that various modifications and changes could be made without departing from the spirit and scope of the invention. For example, bevel gears may be used to replace the drive gear and the driven gear for power transmission from the output shaft of the motor to the linking shaft via the first and second bevel gears.

What is claimed is:

1. A power drill adapter for sawing operation with a saw blade transmission comprising:
    a housing;
    a motor fastened inside said housing, said motor having an output shaft extended out of said housing through a hole thereon and coupled with a drill by a chuck outside said housing;
    a drive gear mounted around said output shaft of said motor;
    a driven gear mounted around a driven shaft inside said housing and meshed with said drive gear;
    a channel bearing disposed inside said housing;
    a transmission gear disposed inside said housing and driven by said driven gear, said transmission gear comprising an eccentric transmission shaft driven by said driven gear to impart a reciprocating movement to said channel bearing; and
    a linking shaft having one end fixed to said channel bearing and an opposite end extended out of said housing through a hole thereon and coupled with a blade holder to hold a saw blade;
    whereby turning on said motor causes said transmission gear to reciprocate said saw blade via said linking shaft and said channel bearing.

2. The power drill adapter according to claim 1 wherein said output shaft and said driven shaft are disposed in parallel with each other.

3. The power drill adapter according to claim 1 wherein said drive gear and said driven gears are spur gears; said transmission gear is driven by said driven gear through a bevel gear mounted around said driven shaft.

4. The power drill adapter according to claim 1 wherein said drive gear, said driven gear, and said transmission gear are all bevel gears.

5. The power drill adapter according to claim 1 wherein said channel bearing comprises a locating block at one side, to which said linking shaft is fixed.

6. The power drill adapter according to claim 1 wherein said said linking shaft is arranged in a horizontal direction so as to be driven to reciprocate horizontally.

7. The power drill adapter according to claim 1 wherein said channel bearing and said locating block are respectively formed in a narrow, elongated configuration.

* * * * *